US010496721B2

United States Patent
Saxena et al.

(10) Patent No.: US 10,496,721 B2
(45) Date of Patent: Dec. 3, 2019

(54) ONLINE ACTIVITY INDEX

(71) Applicant: Microsoft Technology Licensing, LLC, Redmond, WA (US)

(72) Inventors: Vibhu Prakash Saxena, Milpitas, CA (US); Yiran Pang, Palo Alto, CA (US); Kuo-Ning Huang, Los Altos, CA (US); Yue Li, Los Altos, CA (US); Divyakumar Menghani, Sunnyvale, CA (US); Ming Chen, Millbrae, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 403 days.

(21) Appl. No.: 15/339,192

(22) Filed: Oct. 31, 2016

(65) Prior Publication Data

US 2018/0121479 A1    May 3, 2018

(51) Int. Cl.
*G06F 16/9535* (2019.01)
*G06F 16/335* (2019.01)

(52) U.S. Cl.
CPC ........ *G06F 16/9535* (2019.01); *G06F 16/337* (2019.01)

(58) Field of Classification Search
CPC ............. G06F 16/337; G06F 16/9535; G06Q 30/0242
USPC ....................................... 705/14.53; 707/727
See application file for complete search history.

(56) References Cited

U.S. PATENT DOCUMENTS

| | | | | |
|---|---|---|---|---|
| 7,113,917 B2 * | 9/2006 | Jacobi | .................... | G06Q 30/02 705/14.53 |
| 7,181,438 B1 * | 2/2007 | Szabo | ................. | G06F 21/6245 707/770 |
| 7,574,659 B2 * | 8/2009 | Szabo | .................... | G06Q 30/02 715/738 |
| 7,801,896 B2 * | 9/2010 | Szabo | ................. | G06F 21/6245 707/739 |
| 2016/0048370 A1 * | 2/2016 | Zenoff | .................. | G06F 3/1454 715/734 |
| 2016/0267520 A1 * | 9/2016 | Kalish | ................ | G06Q 30/0242 705/14 |

* cited by examiner

*Primary Examiner* — Shahid A Alam
(74) *Attorney, Agent, or Firm* — Schwegman Lundberg & Woessner, P.A.

(57) ABSTRACT

Techniques for searching for generating and using an online activity index for users of an online service are disclosed herein. In some example embodiments, for each one of a plurality of dimensions of online activity for an online service, the system determines a corresponding value for each one of a set of one or more activities corresponding to the dimension for a user of the online service, with the value representing a level of engagement by the user in the corresponding activity via the online service. The system generates a corresponding activity index for each one of the dimensions based on the corresponding value for each one of the set of one or more activities corresponding to the dimension. The system generates content based on the corresponding activity index of at least one of the dimensions, and causes the content to be displayed on a device associated with the user.

15 Claims, 13 Drawing Sheets

| DIMENSION | ACTIVITY | METRIC | SCORE | WEIGHT | TYPE |
|---|---|---|---|---|---|
| DEVELOPMENT | TOTAL # OF GROUPS JOINED | GROUPS_JOINED_ALL | 10 | 19% | COUNTS |
| DEVELOPMENT | PARTICIPATE IN GROUPS | GROUP_PAT | 30 | 28.6% | COUNTS |
| DEVELOPMENT | READING ARTICLES | READ_ART | 25 | 23.8% | COUNTS |
| DEVELOPMENT | CHANNELS | CHANNEL_ALL | 15 | 14.3% | COUNTS |
| DEVELOPMENT | FOLLOWING | FOLLOW_ALL | 15 | 14.3% | COUNTS |
| IDENTITY | UPDATE PROFILE | PROFILE_MODIFIED | 10 | 18.2% | COUNTS |
| IDENTITY | USE ADVANCED FEATURES | NUM_ADV_FEATURES | 20 | 36.3% | COUNTS |
| IDENTITY | ENDORSEMENTS | ENDORSED_ALL | 0 | 0% | COUNTS |
| IDENTITY | PROFILE COMPLETENESS | PROFILE_COMPLETENESS | 25 | 45.5% | COUNTS |
| INFLUENCE | START A GROUP | MBR_STRTGRP | 25 | 13.9% | COUNTS |
| INFLUENCE | ENDORSING | MBR_ENDORSED | 0 | 0% | COUNTS |
| INFLUENCE | SOCIAL ACTION: SHARE/LIKE/ETC. | SOCIAL_ACTION | 15 | 6.3% | COUNTS |
| INFLUENCE | INFLUENCER | INFLUENCER | 75 | 41.7% | BINARY |

ONLINE ACTIVITY INDEX

TECHNICAL FIELD

The present application relates generally to information retrieval and, in one specific example, to methods and systems of generating and using an online activity index for users of an online service.

BACKGROUND

Online services, such as social networking services, often offer users the ability to engage in online activities. However, online services currently do not effectively provide guidance to users as to how they can improve their engagement with the online services.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 8 illustrates a table of dimensions and corresponding activities, in accordance with an example embodiment.

DETAILED DESCRIPTION

Figure 1:
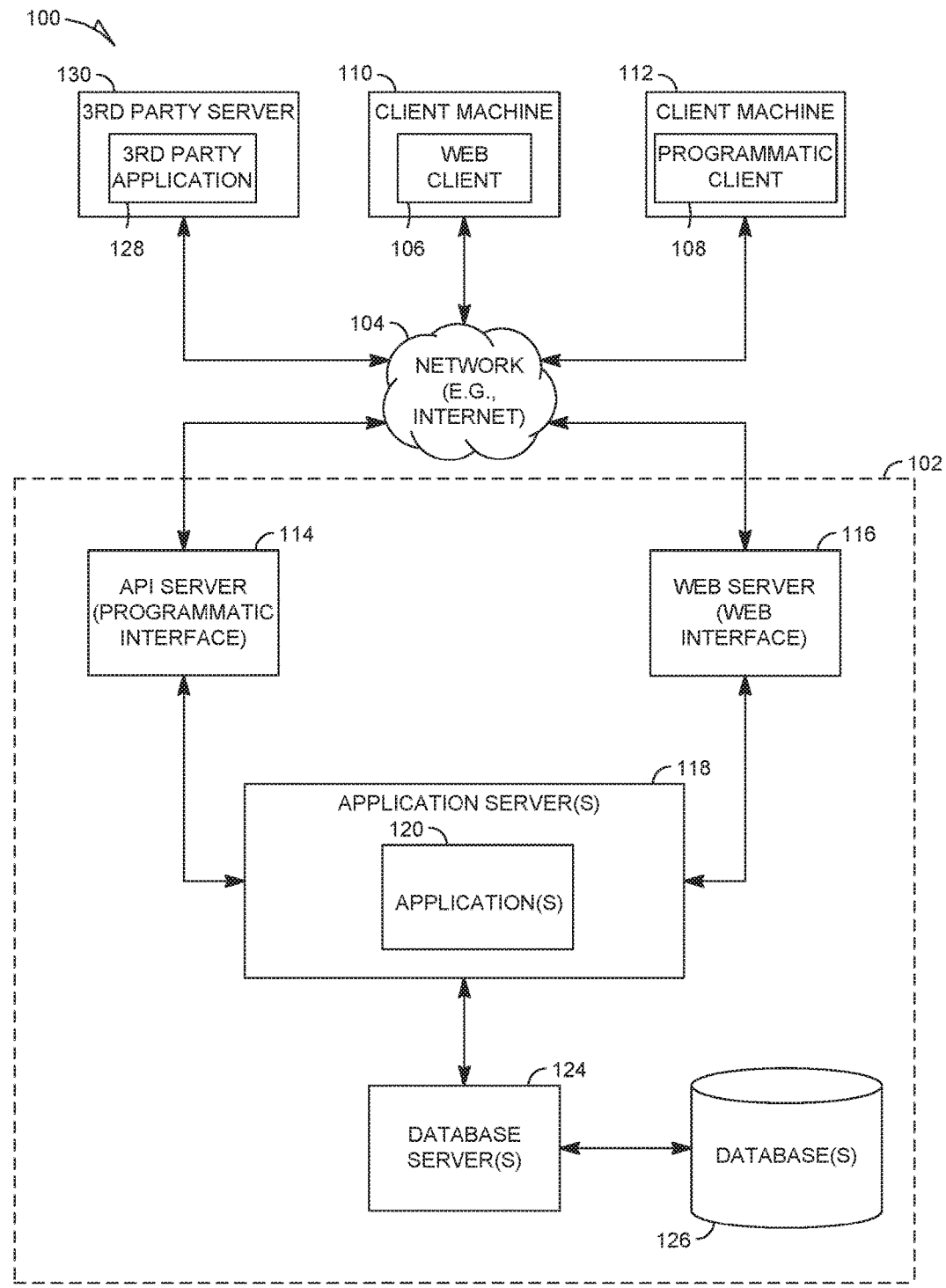
FIG. 1 is a block diagram illustrating a client-server system, in accordance with an example embodiment.

Example methods and systems of generating and using an online activity index for users of an online service are disclosed. In the following description, for purposes of explanation, numerous specific details are set forth in order to provide a thorough understanding of example embodiments. It will be evident, however, to one skilled in the art that the present embodiments may be practiced without these specific details.

The present disclosure introduces techniques of generating and using an online activity index for users of an online service. The online activity index provides a way to quantify the engagement level of a user with the ecosystem of the online service and provides guidance to the user as to what actions he or she can take to improve his or her experience with the online service.

In some example embodiments, operations are performed by a machine having a memory and at least one processor, with the operations comprising: for each one of a plurality of dimensions of online activity for an online service, determining a corresponding value for each one of a set of one or more activities corresponding to the corresponding dimension for a user of the online service, the corresponding value representing a corresponding level of engagement by the user in the corresponding activity via the online service; generating a corresponding activity index for each one of the plurality of dimensions based on the corresponding value for each one of the set of one or more activities corresponding to the dimension; generating content based on the corresponding activity index of at least one of the dimensions; and communicating the content for display on a device associated with the user (e.g., transmitting the content to the device) or otherwise causing the content to be displayed on a device associated with the user.

In some example embodiments, the content comprises a graphic representation of the corresponding activity index for each one of the plurality of dimensions. In some example embodiments, the content comprises at least one recommended activity to increase the corresponding activity index of at least one of the plurality of dimensions.

In some example embodiments, the determining the corresponding value for each one of the set of one or more activities comprises: receiving corresponding data for each one of the set of one or more activities, the data indicating the corresponding level of engagement by the user in the corresponding activity via the online service; receiving additional data for each one of the set of one or more activities, the additional data indicating a corresponding level of engagement by other users in the corresponding activity via the online service; for each one of the set of one or more activities, ranking the user and the other users based on a comparison of the received data corresponding to the user with the received additional data corresponding to the other users; and for each one of the set of one or more activities, determining the corresponding value based on the ranking of the user for the activity. In some example embodiments, the operations further comprise receiving a user input indicating a population with which to compare the corresponding level of engagement by the user for each one of the activities of each one of the plurality of dimensions, wherein the other users are determined based on the population indicated by the user input.

In some example embodiments, the generating the corresponding activity index for each one of the plurality of dimensions comprises: for each one of the plurality of dimensions, weighting the corresponding value for each one of the one or more activities of the dimension, and aggregating the weighted values of the one or more activities of the dimension to generate the corresponding activity index for the dimension.

In some example embodiments, the causing the content to be displayed comprises causing a first graphic representation of the corresponding activity index for each one of the plurality of dimensions to be displayed on a graphic structure comprising indications of different metric levels, and causing a second graphic representation of another corresponding activity index for each one of the plurality of dimensions for a population of one or more other users of the online service to be displayed on the same graphic structure concurrently with the first graphic representation.

In some example embodiments, the online service comprises a social networking service. In some example embodiments, the plurality of dimensions comprises at least one of a development dimension corresponding to activities involving a development of the user, an identity dimension corresponding to activities involving an identity of the user, a network dimension corresponding to activities involving networking, an opportunity dimension corresponding to activities involving job opportunities, and an influence dimension corresponding to social actions.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
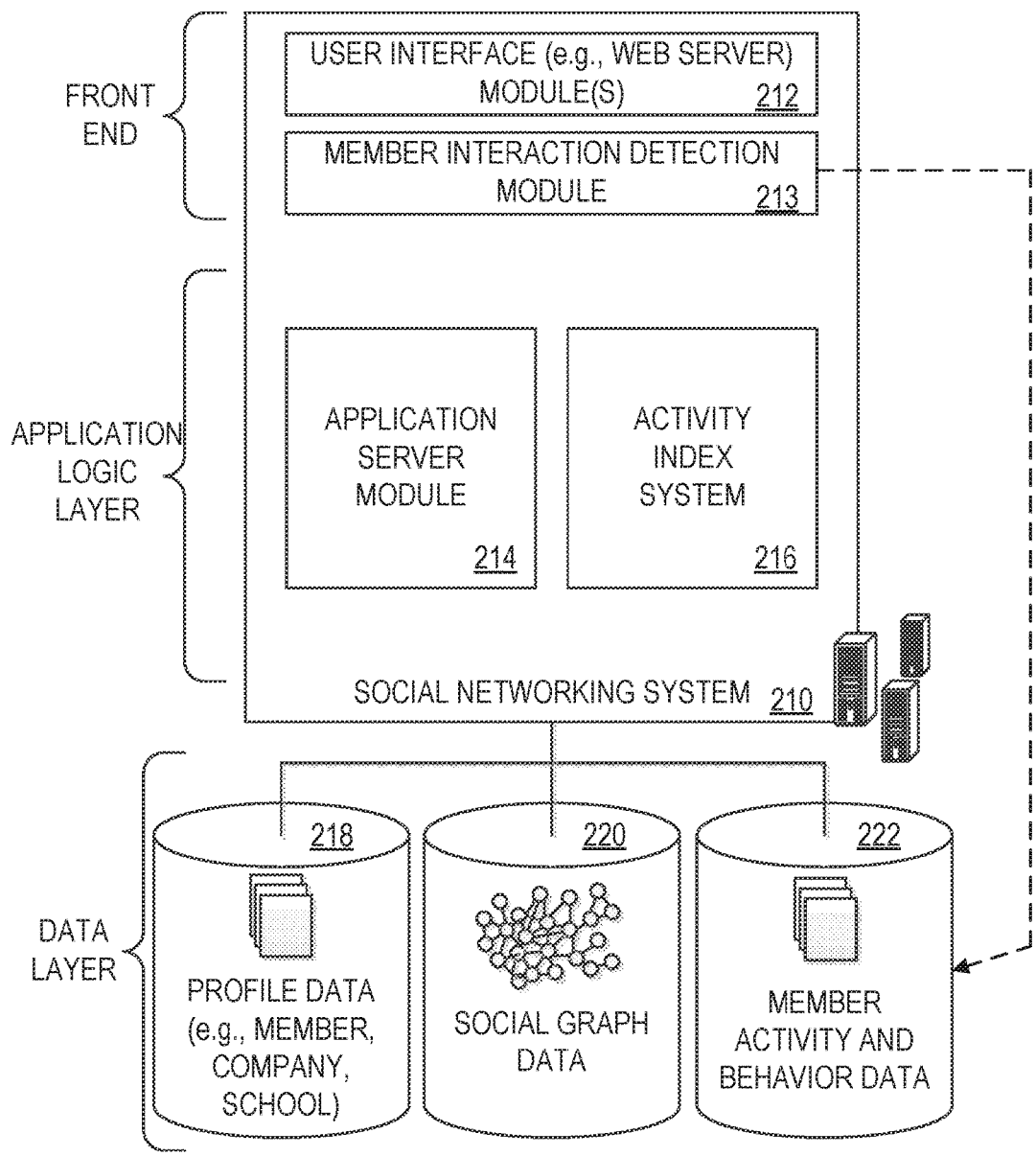
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as an activity index system 216, for use in social networking system 210, consistent with some embodiments of the present disclosure. In some embodiments, the activity index system 216 resides on application server 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the activity index system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on.

This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database with reference number 222. This logged activity information may then be used by the activity index system 216.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the activity index system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
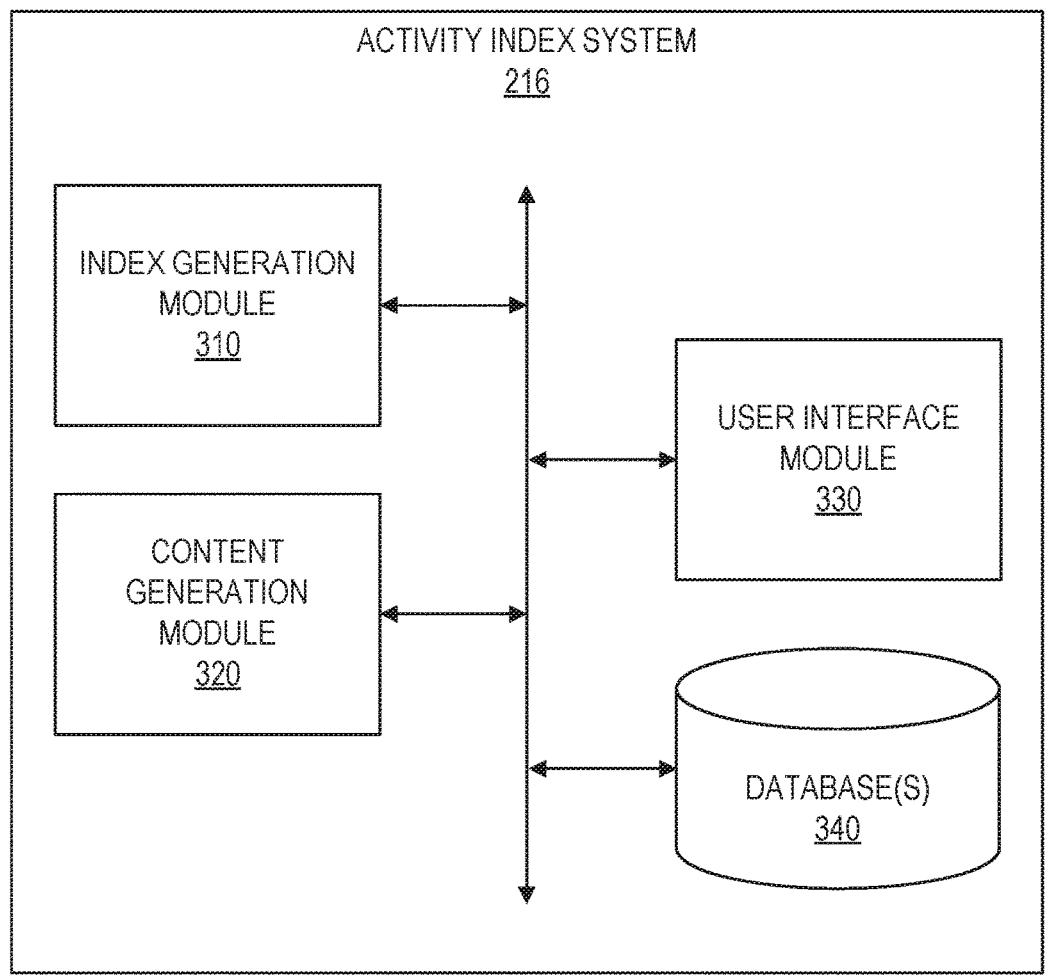
FIG. 3 is a block diagram illustrating components of an activity index system, in accordance with an example embodiment.

FIG. 3 is a block diagram illustrating components of the activity index system 216, in accordance with an example embodiment. In some embodiments, the activity index system 216 comprises any combination of one or more of an index generation module 310, a content generation module 320, a user interface module 330, and one or more database(s) 340. The index generation module 310, the content generation module 320, the user interface module 330, and the database(s) 340 can reside on a machine having a memory and at least one processor (not shown). In some embodiments, the index generation module 310, the content generation module 320, the user interface module 330, and the database(s) 340 can be incorporated into the application server(s) 118 in FIG. 1. In some example embodiments, the database(s) 340 is incorporated into database(s) 126 in FIG. 1 and can include any combination of one or more of databases 218, 220, and 222 in FIG. 2. However, it is contemplated that other configurations of the modules 310, 320, and 330, as well as the database(s) 340, are also within the scope of the present disclosure.

In some example embodiments, the user interface module 330 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, the user interface module 330 is configured to receive user input. For example, the user interface module 330 can present one or more GUI elements (e.g., drop-down menu, selectable buttons, text field) with which a user can submit input.

In some example embodiments, any combination of one or more of the modules 310, 320, an 330 are configured to perform various communication functions to facilitate the functionality described herein, such as by communicating with the social networking system 210 via the network 104 using a wired or wireless connection. Any combination of one or more of the modules 310, 320, and 330 may also provide various web services or functions, such as retrieving information from the third party servers 130 and the social networking system 210. Information retrieved by the any of the modules 310, 320, and 330 may include profile data corresponding to users and members of the social network service from the social networking system 210.

Additionally, any combination of one or more of the modules 310, 320, and 330 can provide various data functionality, such as exchanging information with database(s) 340 or servers. For example, any of the modules 310, 320, and 330 can access member profiles that include profile data from the database(s) 340, as well as extract attributes and/or characteristics from the profile data of member profiles. Furthermore, the one or more of the modules 310, 320, and 330 can access social graph data and member activity and behavior data from database(s) 340, as well as exchange information with third party servers 130, client machines 110, 112, and other sources of information.

In some example embodiments, the index generation module 310 is configured to, for each one of a plurality of dimensions of online activity for an online service, determine a corresponding value for each one of a set of one or more activities corresponding to the corresponding dimension for a user of the online service. The online service may comprise a social networking service. However, it is contemplated that other types of online services are also within the scope of the present disclosure. A dimension of online activity is a category, type, or grouping of online activity. In some example embodiments, the plurality of dimensions comprises any combination of one or more of a development dimension corresponding to activities involving a development of the user (e.g., the user joining a group, the user participating in a group, the user reading/viewing an article), an identity dimension corresponding to activities involving an identity of the user (e.g., the user updating his/her profile, the user using advanced features, the user endorsing another user or receiving an endorsement from another user, the user completing an aspect of his or her profile), a network dimension corresponding to activities involving networking (e.g., the number of connections of the user, the number of messages exchanged by the user), an opportunity dimension corresponding to activities involving job opportunities (e.g., the user viewing a job listing, the user completing or submitting a job application), and an influence dimension corresponding to social actions (e.g., the user starting a group, the user sharing an experience with other users). It is contemplated that other types of dimensions are also within the scope of the present disclosure. The corresponding value for each activity represents a corresponding level of engagement by the user in the corresponding activity via the online service.

In some example embodiments, the index generation module 310 is configured to determine the corresponding value for each one of the set of one or more activities for the user by comparing the corresponding level of engagement of the user in the corresponding activity with the corresponding level of engagement of other users in the corresponding activity. For example, in some example embodiments, the index generation module 310 receives corresponding data for each one of the set of one or more activities, with the data indicating the corresponding level of engagement by the user in the corresponding activity via the online service (e.g., the number of groups joined, the number of articles read or viewed, the number of endorsements, the number of groups started, the number of messages sent or received). In some example embodiments, the index generation module 310 also receives additional data for each one of the set of one or more activities, with the additional data indicating a corresponding level of engagement by other users in the corresponding activity via the online service, and then, for each one of the set of one or more activities, ranks the user and the other users based on a comparison of the received data corresponding to the user with the received additional data corresponding to the other users. In some example embodiments, the index generation module 310 then, for each one of the set of one or more activities, determines the corresponding value based on the ranking of the user for the activity.

In some example embodiments, the index generation module 310 is configured to generate a corresponding activity index for each one of the plurality of dimensions based on the corresponding value for each one of the set of one or more activities corresponding to the dimension. For example, the index generation module 310 can generate an activity index for a development dimension based on the values corresponding to activities involving the development of the user, an activity index for an identity dimension based on the values corresponding to activities involving an identity of the user, an activity index for a network dimension based on the values corresponding to activities involving networking, an activity index for an opportunity dimension based on the values corresponding to activities involving job opportunities, and an activity index for an influence dimension based on the values corresponding to activities involving social actions. Other types and combinations of activity indexes are also within the scope of the present disclosure.

In some example embodiments, the index generation module 310 is configured to generate the corresponding activity index for each one of the plurality of dimensions by weighting the corresponding value for each one of the one or more activities of the dimension, for each one of the plurality of dimensions, and aggregating the weighted values of the one or more activities of the dimension to generate the corresponding activity index for the dimension, for each one of the plurality of dimensions.

FIG. 8 illustrates a table 800 of dimensions and corresponding activities, in accordance with an example embodiment. As seen in FIG. 8, the table 800 includes dimensions corresponding to development, identity, and influence. It is contemplated that other dimensions, such as network and opportunity, can be used as well. The table 800 also includes a list of corresponding activities for each dimension (e.g., total number of groups joined, participate in groups, reading articles, channels, and following for the development dimension), and a corresponding metric identifier for each activity (e.g., GROUPS_JOINED-ALL for total number of groups joined). The metric identifier represents the identifier of the data representing the corresponding activity.

The table 800 also includes a corresponding score for the user for each activity. For example, in FIG. 8, the table includes a score of 10 for the user with respect to the total number of groups joined. In some example embodiments, this score is determined based on a comparison of the corresponding metric data for the user with the corresponding metric data of other users, such as a comparison of the total number of groups joined by the user compared to the total number of groups joined by other users. In some example embodiments, the user is ranked for each activity, and a score is determined for the user for that activity based on the ranking of the user. All of the scores for the activities of a particular dimension can be aggregated to determine an overall activity index for the user for that particular dimension. In some example embodiments, the scores can be weighted, thereby enabling the system to treat certain activities as being more important than others in evaluating a user's engagement level with the online service with respect to the corresponding dimension. Additionally, as seen in FIG. 8, the table 800 can also include a metric type. For example, a user's engagement with respect to certain activities can be measured or otherwise evaluated using the number of times an activity is performed, and therefore use counts as the metric type, whereas the user's engagement with respect to other activities can be measured or otherwise evaluated based on a simple binary metric indicating whether or not an activity has been performed or whether or not a certain condition exists.

Figure 4:
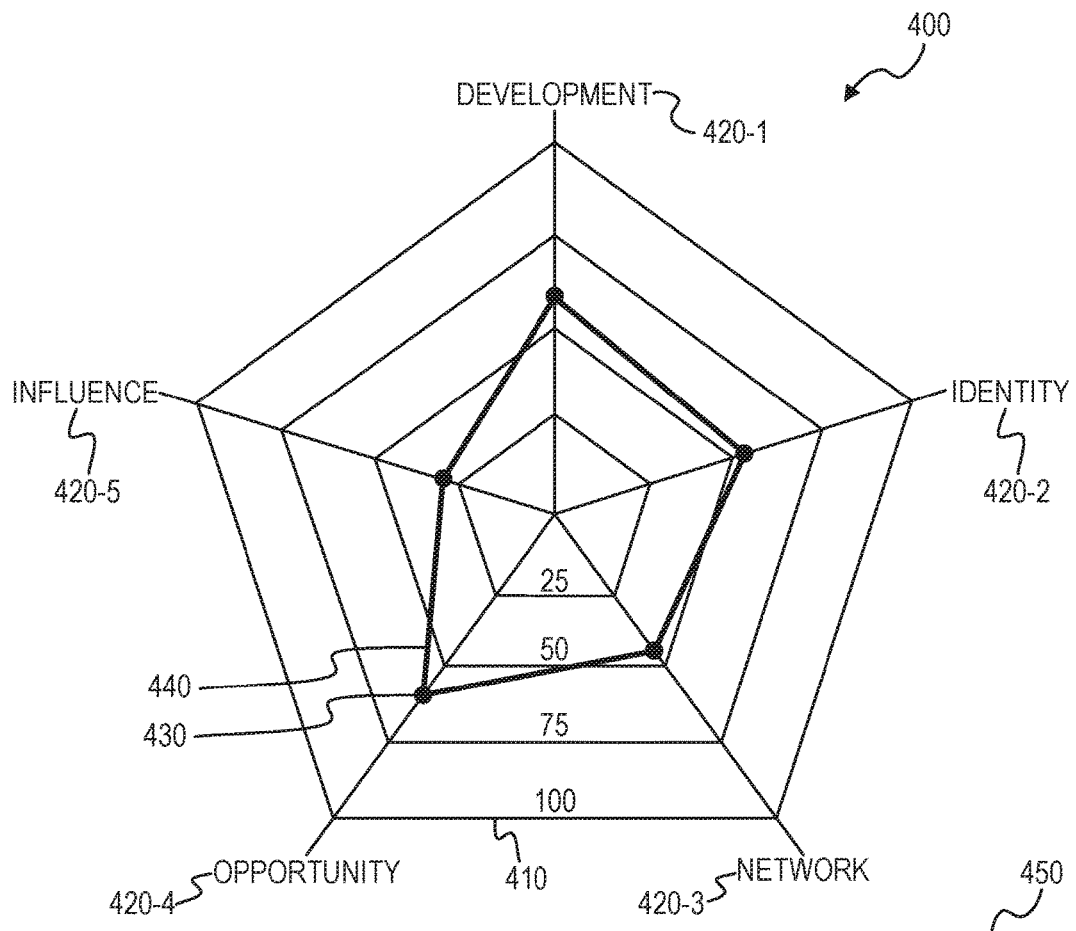
FIG. 4 illustrates a graphical user interface (GUI) displaying a graphical representation of activity indexes, in accordance with an example embodiment.

Referring back to FIG. 3, the content generation module 320 is configured to generate content based on the corresponding activity index of at least one of the dimensions. In some example embodiments, the content comprises a graphic representation of the corresponding activity index for each one of the plurality of dimensions. FIG. 4 illustrates a graphical user interface (GUI) displaying a graphic representation 400 of activity indexes, in accordance with an example embodiment. In some example embodiments, the graphic representation 400 comprises a graphic structure 410 comprising indications of different metric levels. For example, in FIG. 4, the graphic representation 400 comprises a graphic structure 410 in the form of a five-dimensional graph having indications of metric levels 25, 50, 75, and 100.

The graphic representation 400 also comprises graphic indicators 420 corresponding to the plurality of dimensions, such as graphic indicator 420-1 corresponding to a development dimension, graphic indicator 420-2 corresponding to an identity dimension, graphic indicator 420-3 corresponding to a network dimension, graphic indicator 420-4 corresponding to an opportunity dimension, and graphic indicator 420-5 corresponding to an influence dimension. In some example embodiments, each corresponding activity index is represented in the graphic representation 400 by a graphic indicator 430, such as graph point. The graphic indicators 430 for the dimensions can be connected by lines 440 in order to create a visualization of the overall engagement level of the user with respect to all of the dimensions.

In some example embodiments, the content generation module 320 also generates content 450 that comprises at least one recommended activity to increase the corresponding activity index of at least one of the plurality of dimensions. As seen in FIG. 4, the content 450 may comprise an identification 452 of a dimension, the corresponding activity index or score 454 of that dimension, and a recommendation 456 of an action for the user to perform in order to increase the corresponding activity index of that dimension. In some example embodiments, the recommendation 456 includes an instruction as well as a selectable link 458 configured to initiate the recommended action on behalf of the user. For example, the recommendation 456 may include an instruction to connect with other alumni of a particular university and one or more selectable links 458 in the form of an identification of the other alumni. The selectable link 458 may be configured to cause the formation of a social networking connection with the corresponding alumni (e.g., Yiran Pang in FIG. 4).

Figure 5:
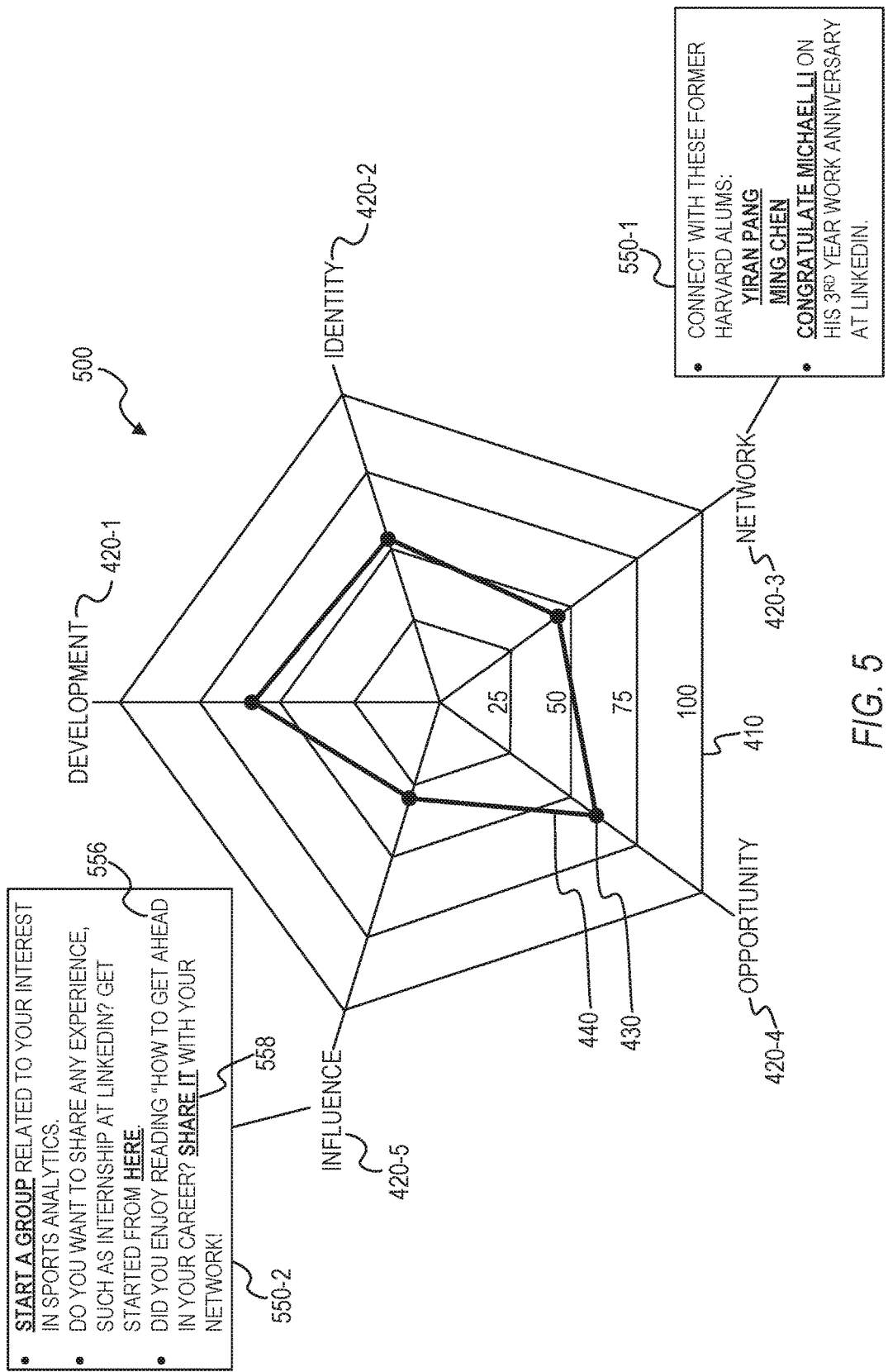
FIG. 5 illustrates a GUI displaying another graphical representation of activity indexes, in accordance with an example embodiment.

FIG. 5 illustrates a graphical user interface GUI displaying another graphical representation 500 of activity indexes, in accordance with an example embodiment. As seen in FIG. 5, in addition to the features disclosed with respect to FIG. 4, the graphic representation 500 can include recommendations 550 being displayed in association with the graphic indicators 420 of the plurality of dimensions. In some example embodiments, each graphic indicator 420 is a selectable link configured to cause the corresponding recommendation 550 to be displayed in response to its selection. For example, in response to a user selecting (e.g., clicking or tapping) graphic indicator 420-3 for the network dimension, the recommendation 550-1 can be displayed proximate, or otherwise visually connected with, the graphic indicator 420-3. Similarly, in response to a user selecting graphic indicator 420-5 for the influence dimension, the recommendation 550-2 can be displayed proximate, or otherwise visually connected with, the graphic indicator 420-5. The recommendations 550 may comprise instructions 556 and selectable links 558 similar to the instructions 456 and selectable links 458 of FIG. 4.

In some example embodiments, the activity index system 216 is configured to enable a user to select different populations with which to compare for the basis of the activity indexes. For example, the activity index system 216 can determine activity indexes for a user based on a comparison of the engagement level of the user with the engagement level of all of the other users of the online service. However, the activity index system 216 can also determine activity indexes for a user based on a comparison of the engagement level of the user with the engagement level of all of the other users that belong to the same company as the user.

Figure 6:
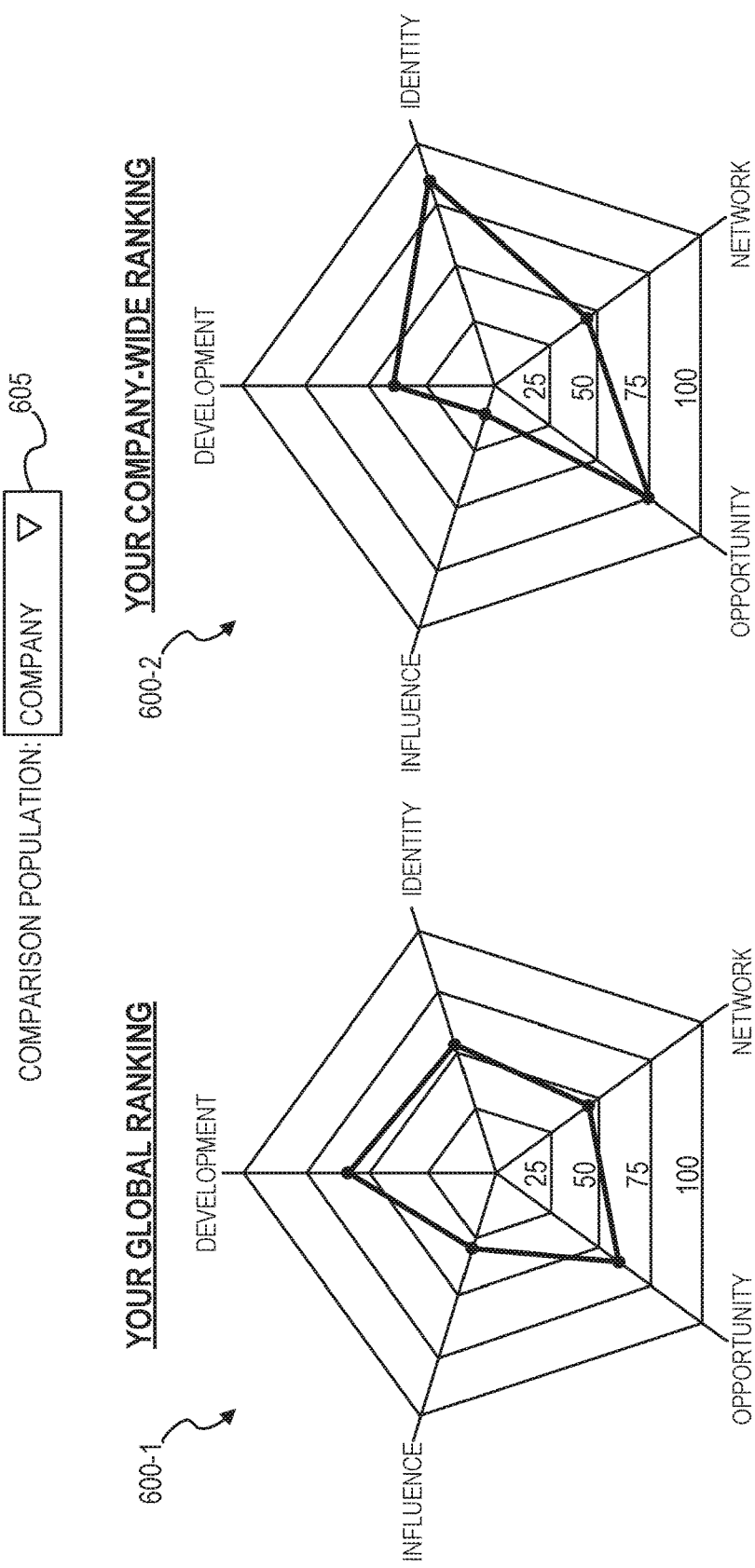
FIG. 6 illustrates a GUI displaying graphical representations of activity indexes with respect to different populations, in accordance with an example embodiment.

FIG. 6 illustrates a GUI displaying graphical representations 600 of activity indexes with respect to different populations, in accordance with an example embodiment. In some example embodiments, the graphical representations 600 comprise all of the features disclosed herein with respect to graphical representations 400 and 500. Additionally, graphical representation 600-1 comprises the activity indexes of the user with respect to a first population (e.g., all of the users of the online service), while graphical representation 600-2 comprises the activity indexes of the user with respect to a second population (e.g., all of the users of the online service that also work for the same company as the user).

In some example embodiments, the user interface module 330 is configured to receive a user input indicating a population with which to compare the corresponding level of engagement by the user for each one of the activities of each one of the plurality of dimensions. For example, the user interface module 330 can provide a drop-down menu 605 or some other type of user interface element that the user can use to select, enter, or otherwise provide the user input indicating the comparison population. The index generation module 310 can use this indication of the population to select the other users with whom the user will be compared when determining the activity indexes for each dimension.

Figure 7:
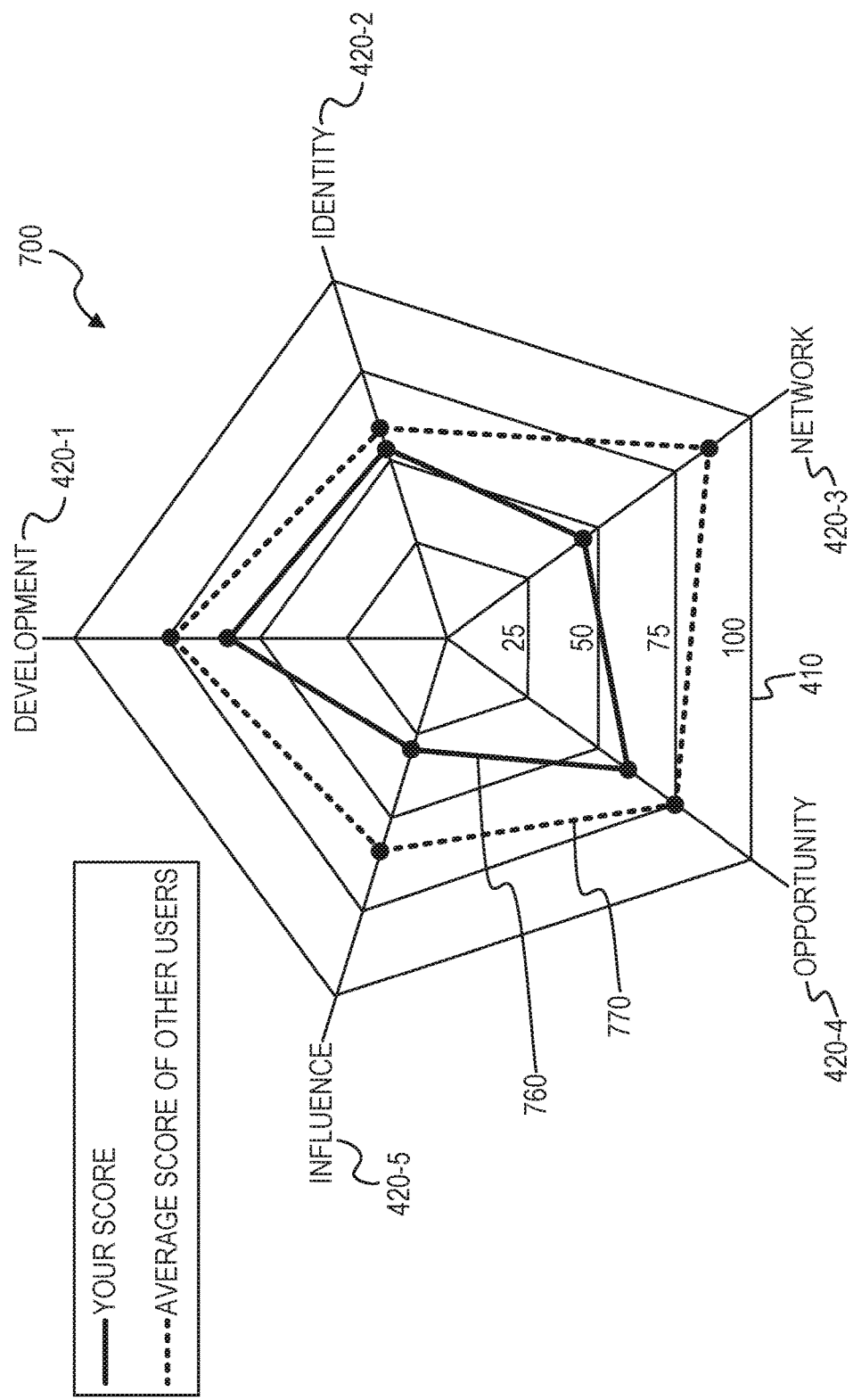
FIG. 7 illustrates a GUI displaying a graphical representation of activity indexes for a user being di splayed on the same graphic structure concurrently with a graphic representation of activity indexes of a population of one or more other users, in accordance with an example embodiment.

In some example embodiments, the activity index system 216 is also configured to display a graphic representation of the corresponding activity index for each one of the plurality of dimensions for a user of an online service concurrently with a graphic representation of another corresponding activity index for each one of the plurality of dimensions for a population of one or more other users of the online service in order to provide the user with a way to visually understand how he or she compares with other users in a comprehensive way. FIG. 7 illustrates a GUI 700 displaying a graphic representation 760 of activity indexes for a user being displayed on the same graphic structure 410 concurrently with a graphic representation 770 of activity indexes of a population of one or more other users, in accordance with an example embodiment. By displaying the different graphic representations 760 and 770 of the activity indexes concurrently, the user is provided with a comprehensive view of how he or she compares to other users in terms of engagement level with the online service.

Figure 9:
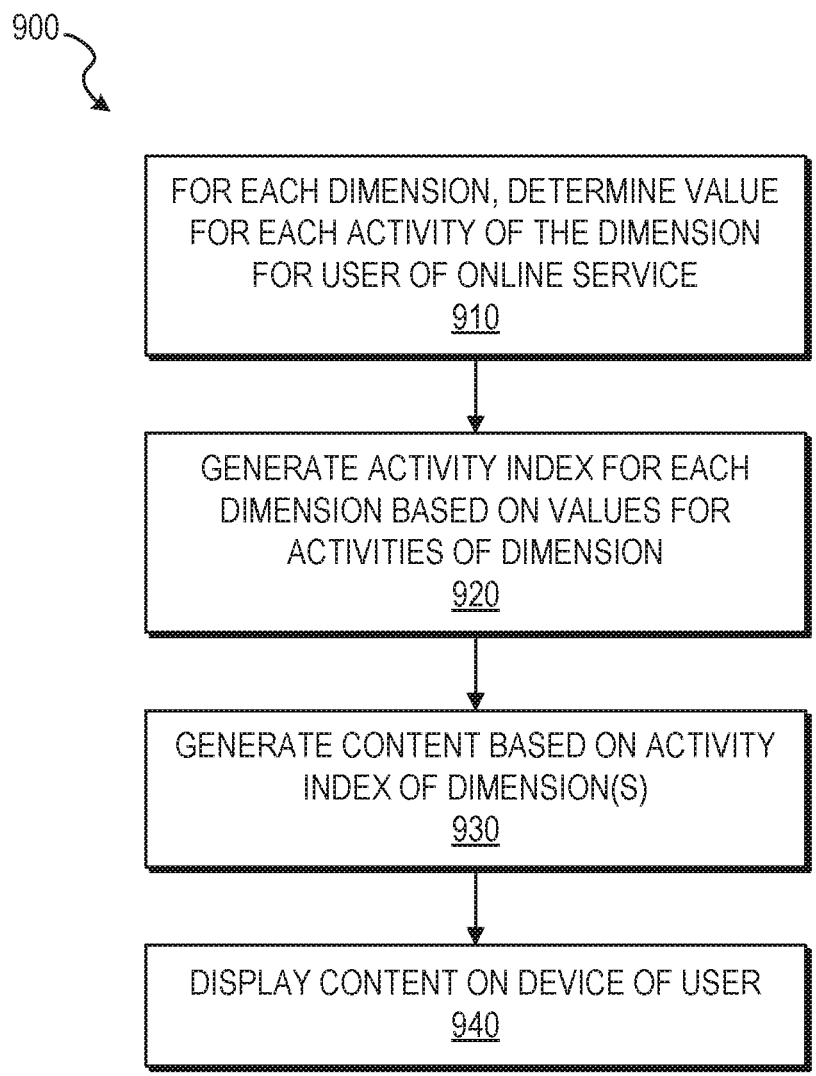
FIG. 9 is a flowchart illustrating a method of generating and using an online activity index, in accordance with an example embodiment.

FIG. 9 is a flowchart illustrating a method 900 of generating and using an online activity index, in accordance with an example embodiment. Method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the activity index system 216 of FIGS. 2-3, or any combination of one or more of its modules, as described above.

At operation 910, for each one of a plurality of dimensions of online activity for an online service, the activity index system 216 determines a corresponding value for each one of a set of one or more activities corresponding to the corresponding dimension for a user of the online service, with the corresponding value representing a corresponding level of engagement by the user in the corresponding activity via the online service. In some example embodiments, the online service comprises a social networking service. In some example embodiments, the plurality of dimensions comprises at least one of a development dimension corresponding to activities involving a development of the user, an identity dimension corresponding to activities involving an identity of the user, a network dimension corresponding to activities involving networking, an opportunity dimension corresponding to activities involving job opportunities, and an influence dimension corresponding to social actions.

At operation 920, the activity index system 216 generates a corresponding activity index for each one of the plurality of dimensions based on the corresponding value for each one of the set of one or more activities corresponding to the dimension.

At operation 930, the activity index system 216 generates content based on the corresponding activity index of at least one of the dimensions.

At operation 940, the activity index system 216 causes the content to be displayed on a device associated with the user. For example, the activity index system 216 may transmit the content to the device associated with the user.

In some example embodiments, the content comprises a graphic representation of the corresponding activity index for each one of the plurality of dimensions. In some example embodiments, the content comprises at least one recommended activity to increase the corresponding activity index of at least one of the plurality of dimensions.

It is contemplated that any of the other features described within the present disclosure can be incorporated into method 900.

Figure 10:
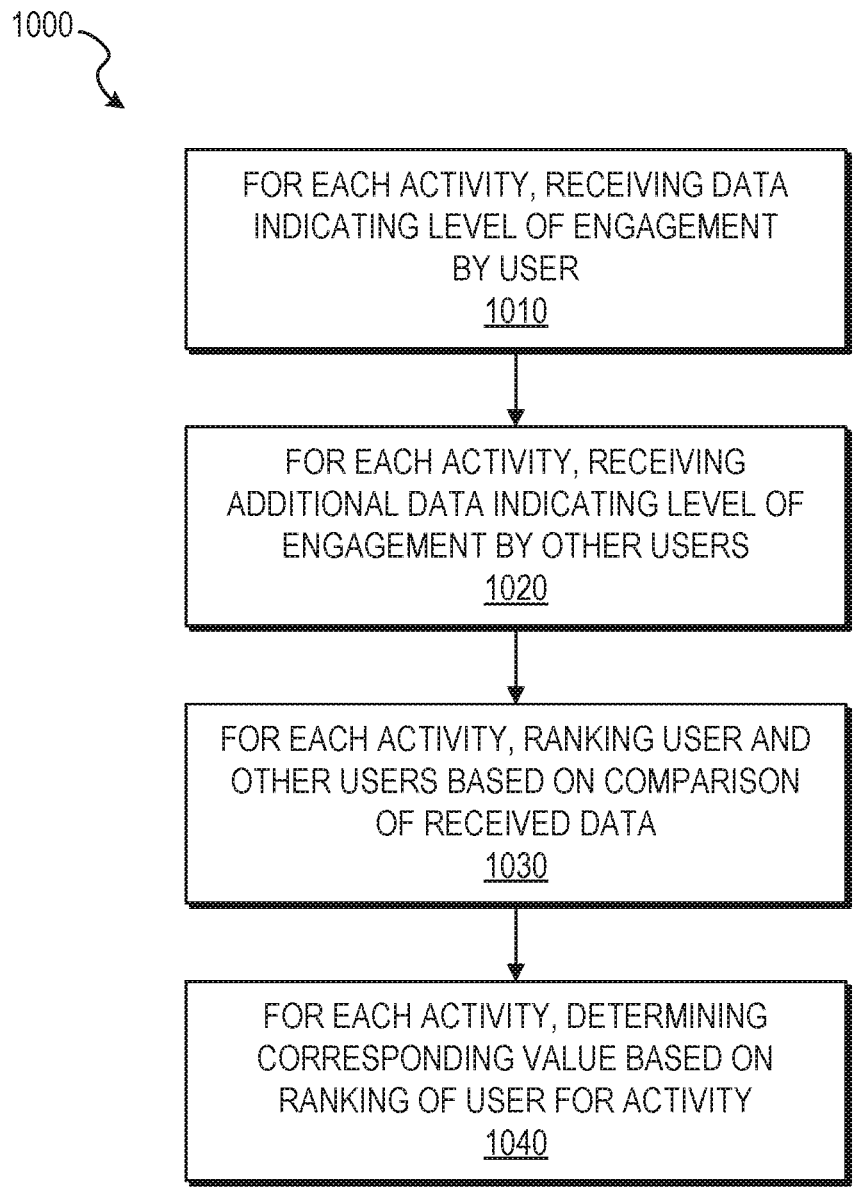
FIG. 10 is a flowchart illustrating a method of determining the corresponding value for each one of a set of one or more activities, in accordance with an example embodiment.

FIG. 10 is a flowchart illustrating a method 1000 of determining the corresponding value for each one of a set of one or more activities, in accordance with an example embodiment. Method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the activity index system 216 of FIGS. 2-3, or any combination of one or more of its modules, as described above.

At operation 1010, the activity index system 216 receives corresponding data for each one of the set of one or more activities, with the data indicating the corresponding level of engagement by the user in the corresponding activity via the online service.

At operation 1020, the activity index system 216 receives additional data for each one of the set of one or more activities, with the additional data indicating a corresponding level of engagement by other users in the corresponding activity via the online service. In some example embodiments, the activity index system 216 receives a user input indicating a population with which to compare the corresponding level of engagement by the user for each one of the activities of each one of the plurality of dimensions, and the other users are determined based on the population indicated by the user input.

At operation 1030, for each one of the set of one or more activities, the activity index system 216 ranks the user and the other users based on a comparison of the received data corresponding to the user with the received additional data corresponding to the other users.

At operation 1040, the activity index system 216, for each one of the set of one or more activities, determines the corresponding value based on the ranking of the user for the activity.

It is contemplated that any of the other features described within the present disclosure can be incorporated into method 1000.

Figure 11:
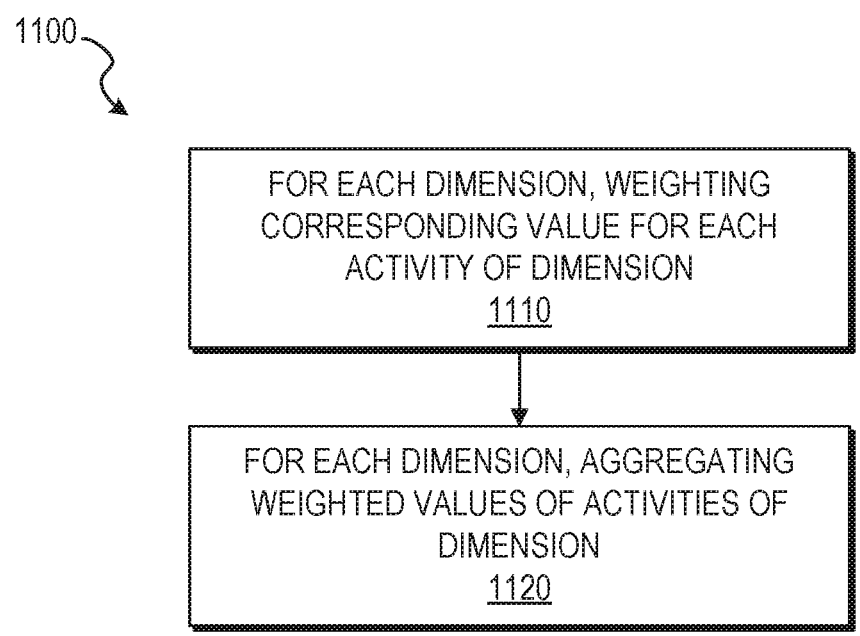
FIG. 11 is a flowchart illustrating a method of generating a corresponding activity index for each one of a plurality of dimensions, in accordance with an example embodiment.

FIG. 11 is a flowchart illustrating a method 1100 of generating a corresponding activity index for each one of a plurality of dimensions, in accordance with an example embodiment. Method 1100 can be performed by processing logic that can comprise hardware (e.g., circuitry, dedicated logic, programmable logic, microcode, etc.), software (e.g., instructions run on a processing device), or a combination thereof. In one implementation, the method 1100 is performed by the activity index system 216 of FIGS. 2-3, or any combination of one or more of its modules, as described above.

At operation 1110, for each one of the plurality of dimensions, the activity index system 216 weights the corresponding value for each one of the one or more activities of the dimension.

At operation 1120, for each one of the plurality of dimensions, the activity index system 216 aggregates the weighted values of the one or more activities of the dimension to generate the corresponding activity index for the dimension.

It is contemplated that any of the other features described within the present disclosure can be incorporated into method 1100.

Example Mobile Device

Figure 12:
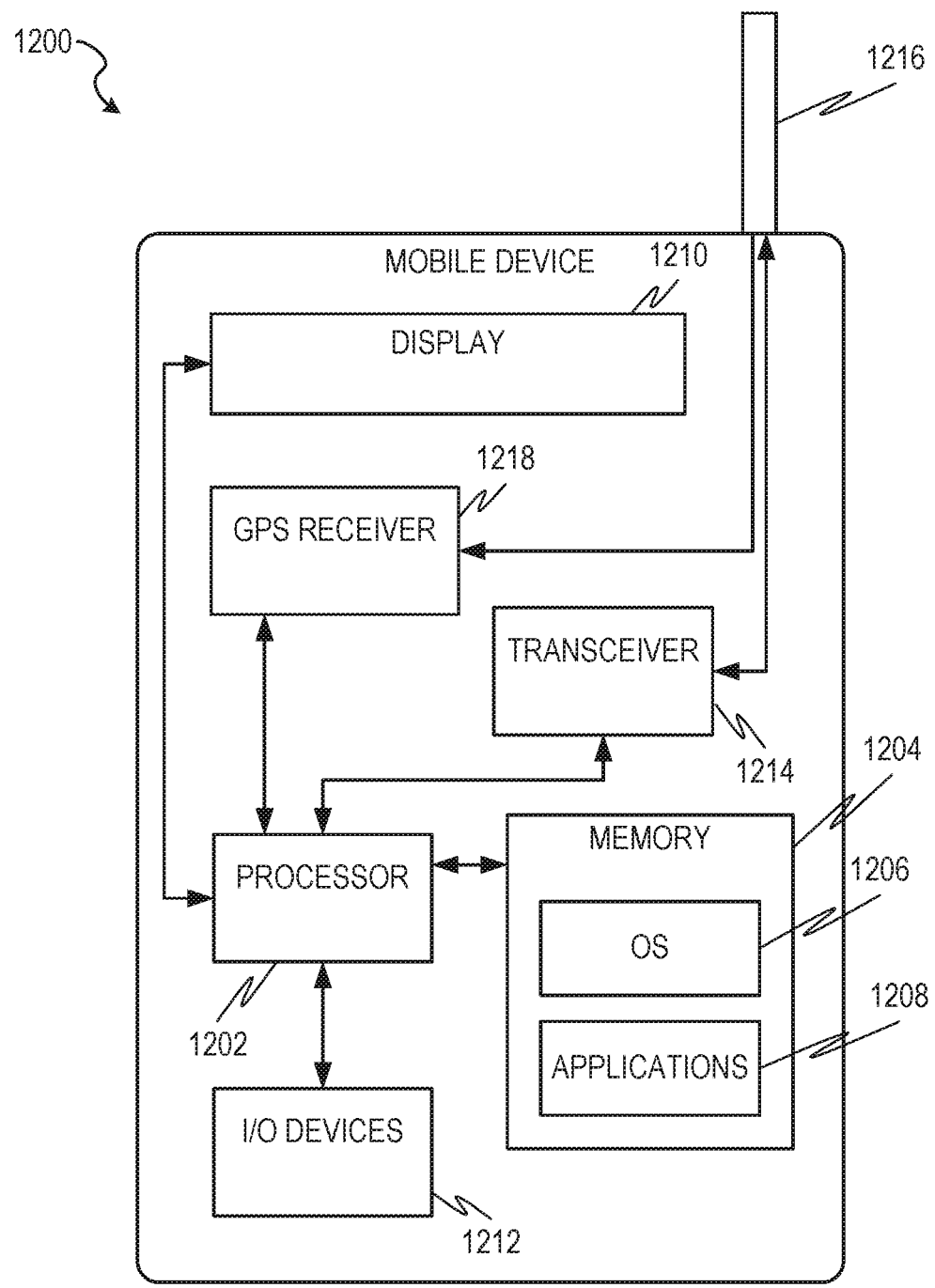
FIG. 12 is a block diagram illustrating a mobile device, in accordance with some example embodiments.

FIG. 12 is a block diagram illustrating a mobile device 1200, according to an example embodiment. The mobile device 1200 can include a processor 1202. The processor 1202 can be any of a variety of different types of commercially available processors suitable for mobile devices 1200 (for example, an XScale architecture microprocessor, a Microprocessor without Interlocked Pipeline Stages (MIPS) architecture processor, or another type of processor). A memory 1204, such as a random access memory (RAM), a Flash memory, or other type of memory, is typically accessible to the processor 1202. The memory 1204 can be adapted to store an operating system (OS) 1206, as well as application programs 1208, such as a mobile location-enabled application that can provide location-based services (LBSs) to a user. The processor 1202 can be coupled, either directly or via appropriate intermediary hardware, to a display 1210 and to one or more input/output (I/O) devices 1212, such as a keypad, a touch panel sensor, a microphone, and the like. Similarly, in some embodiments, the processor 1202 can be coupled to a transceiver 1214 that interfaces with an antenna 1216. The transceiver 1214 can be configured to both transmit and receive cellular network signals, wireless data signals, or other types of signals via the antenna 1216, depending on the nature of the mobile device 1200. Further, in some configurations, a GPS receiver 1218 can also make use of the antenna 1216 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
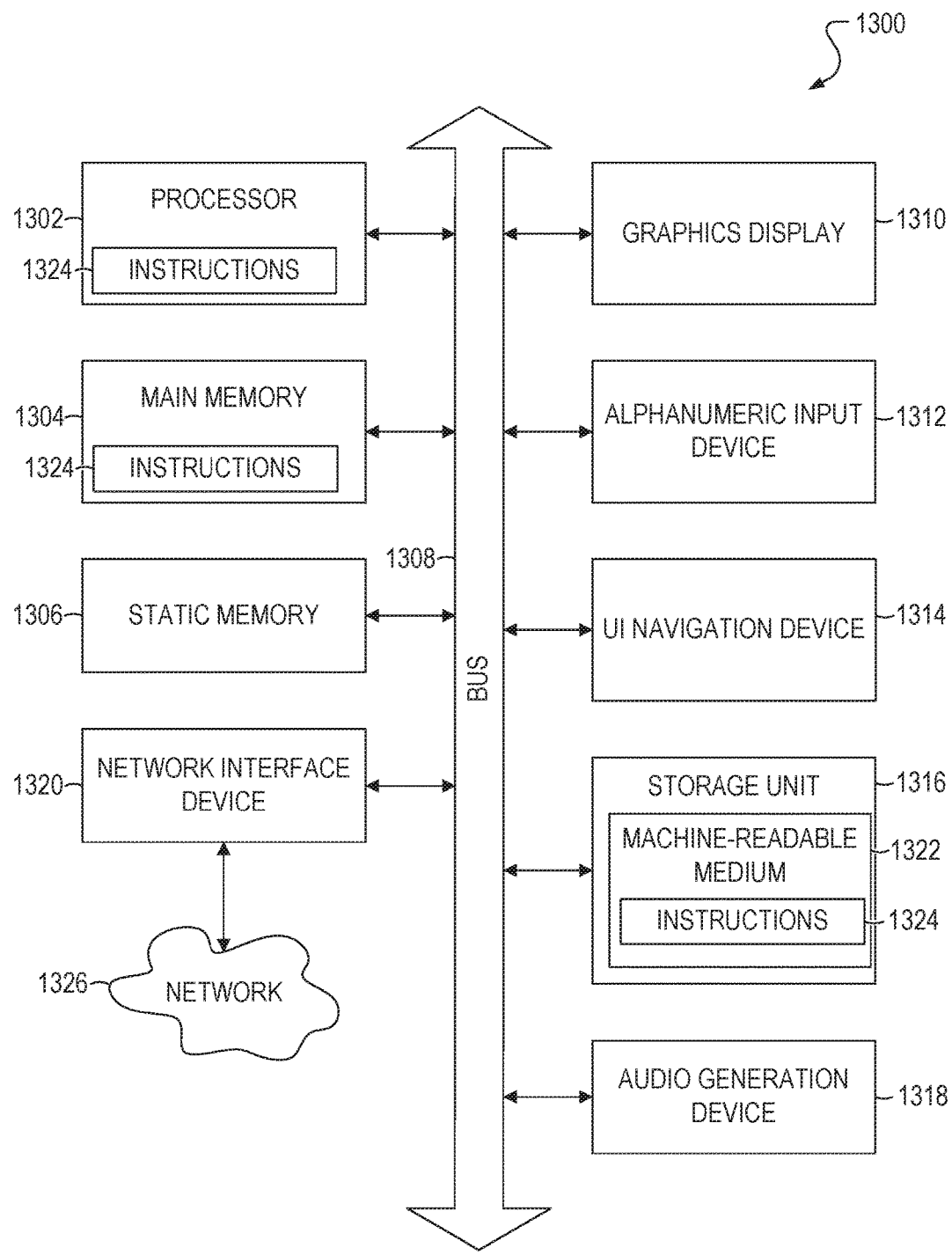
FIG. 13 is a block diagram of an example computer system on which methodologies described herein may be executed, in accordance with an example embodiment.

FIG. 13 is a block diagram of an example computer system 1300 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a graphics display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation device 1314 (e.g., a mouse), a storage unit 1316, a signal generation device 1318 (e.g., a speaker) and a network interface device 1320.

Machine-Readable Medium

The storage unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions (e.g., instructions 1324) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:

for each one of a plurality of dimensions of online activity for an online service, determining a corresponding value for each one of a set of one or more activities corresponding to the dimension for a user of the online service, the corresponding value representing a corresponding level of engagement by the user in the corresponding activity via the online service;

generating, by a machine having a memory and at least one processor, a corresponding activity index for each one of the plurality of dimensions based on the corresponding value for each one of the set of one or more activities corresponding to the dimension;

generating content based on the corresponding activity index of at least one of the dimensions; and communicating the content for display on a device associated with the user, the communicating the content for display comprising:

causing a first graphic representation of the corresponding activity index for each one of the plurality of dimensions to be displayed on a graphic structure comprising indications of different metric levels; and causing a second graphic representation of another corresponding activity index for each one of the plurality of dimensions for a population of one or more other users of the online service to be displayed on the same graphic structure concurrently with the first graphic representation.

2. The computer-implemented method of claim 1, wherein the content comprises at least one recommended activity to increase the corresponding activity index of at least one of the plurality of dimensions.

3. The computer-implemented method of claim 1, wherein the determining the corresponding value for each one of the set of one or more activities comprises:

receiving corresponding data for each one of the set of one or more activities, the data indicating the corresponding level of engagement by the user in the corresponding activity via the online service;

receiving additional data for each one of the set of one or more activities, the additional data indicating a corresponding level of engagement by other users in the corresponding activity via the online service;

for each one of the set of one or more activities, ranking the user and the other users based on a comparison of the received data corresponding to the user with the received additional data corresponding to the other users; and for each one of the set of one or more activities, determining the corresponding value based on the ranking of the user for the activity.

4. The computer-implemented method of claim 3, further comprising:

receiving a user input indicating a population with which to compare the corresponding level of engagement by the user for each one of the activities of each one of the plurality of dimensions, wherein the other users are determined based on the population indicated by the user input.

5. The computer-implemented method of claim 1, wherein the generating the corresponding activity index for each one of the plurality of dimensions comprises:

for each one of the plurality of dimensions, weighting the corresponding value for each one of the one or more activities of the dimension; and for each one of the plurality of dimensions, aggregating the weighted values of the one or more activities of the dimension to generate the corresponding activity index for the dimension.

6. The computer-implemented method of claim 1, wherein the online service comprises a social networking service.

7. The computer-implemented method of claim 1, wherein the plurality of dimensions comprises at least one of a development dimension corresponding to activities involving a development of the user, an identity dimension corresponding to activities involving an identity of the user, a network dimension corresponding to activities involving networking, an opportunity dimension corresponding to activities involving job opportunities, and an influence dimension corresponding to social actions.

8. A system comprising:

at least one processor; and a non-transitory machine-readable medium embodying a set of instructions that, when executed by the at least one processor, cause the at least one processor to perform operations, the operations comprising:

for each one of a plurality of dimensions of online activity for an online service, determining a corresponding value for each one of a set of one or more activities corresponding to the dimension for a user of the online service, the corresponding value representing a corresponding level of engagement by the user in the corresponding activity via the online service;

generating a corresponding activity index for each one of the plurality of dimensions based on the corresponding value for each one of the set of one or more activities corresponding to the dimension;

generating content based on the corresponding activity index of at least one of the dimensions; and causing the content to be displayed on a device associated with the user, the causing the content to be displayed comprising:

causing a first graphic representation of the corresponding activity index for each one of the plurality of dimensions to be displayed on a graphic structure comprising indications of different metric levels; and causing a second graphic representation of another corresponding activity index for each one of the plurality of dimensions for a population of one or more other users of the online service to be displayed on the same graphic structure concurrently with the first graphic representation.

9. The system of claim 8, wherein the content comprises at least one recommended activity to increase the corresponding activity index of at least one of the plurality of dimensions.

10. The system of claim 8, wherein the determining the corresponding value for each one of the set of one or more activities comprises:

receiving corresponding data for each one of the set of one or more activities, the data indicating the corresponding level of engagement by the user in the corresponding activity via the online service;

receiving additional data for each one of the set of one or more activities, the additional data indicating a corresponding level of engagement by other users in the corresponding activity via the online service;

for each one of the set of one or more activities, ranking the user and the other users based on a comparison of the received data corresponding to the user with the received additional data corresponding to the other users; and for each one of the set of one or more activities, determining the corresponding value based on the ranking of the user for the activity.

11. The system of claim 10, wherein the operations further comprise:

receiving a user input indicating a population with which to compare the corresponding level of engagement by the user for each one of the activities of each one of the plurality of dimensions, wherein the other users are determined based on the population indicated by the user input.

12. The system of claim 8, wherein the generating the corresponding activity index for each one of the plurality of dimensions comprises:

for each one of the plurality of dimensions, weighting the corresponding value for each one of the one or more activities of the dimension; and for each one of the plurality of dimensions, aggregating the weighted values of the one or more activities of the dimension to generate the corresponding activity index for the dimension.

13. The system of claim 8, wherein the online service comprises a social networking service.

14. The system of claim 8, wherein the plurality of dimensions comprises at least one of a development dimension corresponding to activities involving a development of the user, an identity dimension corresponding to activities involving an identity of the user, a network dimension corresponding to activities involving networking, an opportunity dimension corresponding to activities involving job opportunities, and an influence dimension corresponding to social actions.

15. A non-transitory machine-readable medium embodying a set of instructions that, when executed by a processor, cause the processor to perform operations, the operations comprising:

for each one of a plurality of dimensions of online activity for an online service, determining a corresponding value for each one of a set of one or more activities corresponding to the dimension for a user of the online service, the corresponding value representing a corresponding level of engagement by the user in the corresponding activity via the online service;

generating, by a machine having a memory and at least one processor, a corresponding activity index for each one of the plurality of dimensions based on the corresponding value for each one of the set of one or more activities corresponding to the dimension;

generating content based on the corresponding activity index of at least one of the dimensions; and causing the content to be displayed on a device associated with the user, the causing the content to be displayed comprising:

causing a first graphic representation of the corresponding activity index for each one of the plurality of dimensions to be displayed on a graphic structure comprising indications of different metric levels; and causing a second graphic representation of another corresponding activity index for each one of the plurality of dimensions for a population of one or more other users of the online service to be displayed on the same graphic structure concurrently with the first graphic representation.

* * * * *